United States Patent [19]
Anthony et al.

[11] 3,853,703
[45] Dec. 10, 1974

[54] FUEL ASSEMBLY HOLD-UP DEVICE

[75] Inventors: Andrew James Anthony, Tariffville; John Jefferson Hutchinson, Windsor; Ralph Howard Klumb, Simsbury, all of Conn.

[73] Assignee: Combustion Engineering, Inc., Windsor, Conn.

[22] Filed: July 3, 1972

[21] Appl. No.: 268,347

[52] U.S. Cl. .................................... 176/87, 176/50
[51] Int. Cl. ............................................... G21c 3/00
[58] Field of Search ................................. 176/50, 87

[56] References Cited
UNITED STATES PATENTS

| | | | |
|---|---|---|---|
| 3,205,144 | 9/1965 | Jabsen | 176/50 |
| 3,398,050 | 8/1968 | Yevick et al. | 176/50 |
| R27,173 | 9/1971 | Lass et al. | 176/87 |

OTHER PUBLICATIONS
Garkisch et al., Def. Pub. Search Copy of Serial No. 210,447, filed 12/21/71, published in 911 O.G. 1,137 on June 26, 1973.

*Primary Examiner*—Harvey E. Behrend
*Attorney, Agent, or Firm*—Frederick A. Goettel, Jr.

[57] ABSTRACT

A hold-up device for nuclear reactor fuel assemblies which precludes the possibility of axial movement of the assemblies due to hydraulic forces under all thermal and flow conditions in the reactor core region. The fuel assembly is spring loaded against the upper guide structure, and supported so as to allow significant thermal expansion differential between the assembly and its support structure. In a preferred embodiment the fuel assembly lower end fitting alignment posts are extended into the core support structure where each post is supported by a spring contained within a cartridge which is press fitted into the core support plate. The fuel assembly is loaded against the upper guide structure by the hold-up device during installation of the upper guide structure. The device is insensitive to all hydraulic load increases since the flow force is opposed by the upper guide structure.

4 Claims, 5 Drawing Figures

FUEL ASSEMBLY HOLD-UP DEVICE

BACKGROUND OF THE INVENTION

1. Field of the Invention

The present invention relates to nuclear fuel assemblies and more particularly to hold-up devices for nuclear fuel assemblies.

2. Description of the Prior Art

It is well known that the fuel or fissionable material for heterogeneous nuclear reactors is conventionally contained in a number of thin-walled tubes forming elongated fuel elements which may be grouped and joined together into fuel element assemblies. Each reactor has a number of such fuel assemblies therein comprising the reactor core. A typical reactor includes an upper core alignment plate and a lower core support plate between which the fuel assemblies are vertically arranged and supported. These plates are generally supported directly or indirectly by a core support barrel which surrounds the entire core and extends beyond the ends thereof.

During normal reactor operation local temperatures within the core may vary greatly. As a result, thermal expansion experienced by the various core elements may also vary from location to location. Further, because the materials used in the core region are not all the same, the thermal growth of elements within any one temperature region may also vary greatly. Because of the high temperature found within nuclear reactors and particularly because of the length of some of the core members, which may be 12–15 feet or more in length, thermal expansion in the axial or vertical direction may be quite significant. For these reasons the fuel assemblies are usually supported by the core alignment and support structures in a manner which permits relative axial growth to occur without creating undesirable stresses in the elements.

The axial thermal expansion differential which may occur between the fuel assemblies and the core support barrel is generally accommodated by insuring that the vertically measured distance between the upper core alignment plate and the lower support plate is greater than the length of the fuel assembly for the entire range of thermal conditions in the core region. A common arrangement for supporting the fuel assemblies between the two plates is by means of alignment posts extending outwardly from the ends of the fuel assemblies and slidably engaging post receiving openings in the plates. The lower end of the fuel assembly would rest on, and thus its weight borne by, the lower core support plate. Such an arrangement laterally aligns the fuel assemblies and provides for relative axial thermal growth which may occur.

To overcome the above-mentioned thermal growth problem and also to facilitate installation and removal of the fuel assemblies, the assemblies are generally not positively attached to the lower core support plate and as described above rest on and are aligned by posts engaging this plate. As a result, the assemblies are free to move in the axial direction within the limits of the upper and lower plates. Such freedom of motion introduces a further problem.

In most reactors a fluid coolant, such as water, is directed upward through apertures in the lower core support plate and along the fuel elements in order to receive thermal energy therefrom. The physical configuration of the various fuel assemblies is such that the coolant flow experiences a significant pressure drop in passing upwardly through the core region. This pressure drop necessarily produces a lifting force on the fuel assemblies. In some reactors, the weight of the fuel assembly is sufficient to overcome the upward hydraulic lifting forces under all operating conditions. This is often not the case, however, particularly when the coolant density is high as at reactor start-up. Thus when the hydraulic forces in the upward direction on a particular fuel assembly exceed the weight of that assembly the assembly will be forced upward into contact with the upper core alignment plate. This upward motion, if uncontrolled, may result in damage to the fuel assembly and its fuel rods and to the upper alignment plate; it must, therefore, be prevented. Various prior art solutions to this problem have involved hold-down devices to prevent the hydraulic lifting of the fuel assemblies.

In reactor designs where the core support barrel and the vertically extending structural members of the fuel assemblies have been made of the same material the potential for differential axial thermal expansion has been very limited. Accordingly the spacing between the upper core alignment plate and the upper end of the fuel assembly has been quite small. In such designs, leaf springs between the upper core alignment plate and the fuel assemblies were sufficient to overcome any lifting of the assemblies.

In recent designs, however, the vertically extending structural members of fuel assemblies have been made of material having a low neutron absorption cross section, to increase the efficiency of the reactor. Zircaloy, one such material, however, has a coefficient of thermal expansion significantly less than that of the material, typically stainless steel, from which the core support barrel is made. As a result, significant differential axial thermal expansion between the structures may occur. As an example, in a reactor having a stainless steel core support barrel and fuel assemblies supported by Zircaloy guide tubes, the gap between the fuel assembly and the upper core alignment plate may be as much as five-eighths of an inch. Various hold-down devices have been used with success in such designs. One approach has been to incorporate coil springs in the upper end of the fuel assemblies which react between the upper end fitting and the upper core alignment plate to hold the fuel assembly down against the core support plate.

In the most recent designs, however, the hydraulic lifting forces on the fuel assemblies have increased greatly as a result of higher flows and the use of flow mixing promoting devices between the individual fuel rods. In order to accommodate sufficient preload to overcome these lifting forces it has become necessary to increase the size of the hold-down springs and as a result the overall length of the fuel assemblies. In such an arrangement any increase in fuel assembly length increases the distance required between the upper and lower core plates and thus also increases the length of the core barrel, reactor vessel, the control elements, and the reactor upper guide structure. Thus an increase in spring length results in a significant increase in cost of all of these reactor components. A further disadvantage of these designs is apparent during installation and removal of the reactor pressure vessel closure head. The total preload which the upper springs must provide can be greater than the combined weight of the upper guide structure and the reactor vessel head, under such conditions special techniques are required for bolting and untorquing of the reactor vessel head.

Another disadvantage of the upper spring is that in the case of failure of a spring the associated fuel assembly will be displaced upwardly relative to the rest of the core during reactor operation, and would become properly aligned only during shutdown.

SUMMARY OF THE INVENTION

The aforementioned disadvantage existing in prior art designs are overcome by providing a hold-up device which loads the fuel assemblies against the upper guide structure and which is thus insensitive to all hydraulic load increases.

Alignment posts extend outwardly from the upper and lower end plates of a fuel assembly which is structurally tied together by Zircaloy tubes which serve also as guides for control element rods and instrumentation probes. The upper posts are slidably received in the upper core alignment plate which is supported by the reactor upper guide structure. The lower posts are slidably received in alignment means extending from the core support plate. A spring means is arranged relative to the fuel assembly lower end plate and the core support plate to positively bias the fuel assembly upward against upper core alignment plate.

In the preferred embodiment the spring means comprises spring containing cartridges press fitted into openings in the core support plate. The upper end of the cartridges serve as an alignment means to receive the lower alignment posts and the springs react upwardly on the lower end of the posts.

With such a design the combined upward force of the springs supporting each fuel assembly need only be sufficient to support the weight of the assembly. The upward flow force of the coolant serves to increase the effectiveness of the system by further urging the assembly against the alignment plate. Also, because less spring force is required, the weight of the vessel head and upper guide structure is greater than the total spring force and conventional torquing techniques may be used.

Other advantages of the invention will become apparent upon reading the following detailed description of illustrative embodiments and upon reference to the drawings.

DESCRIPTION OF THE PREPFERRED EMBODIMENT

Figure 1:
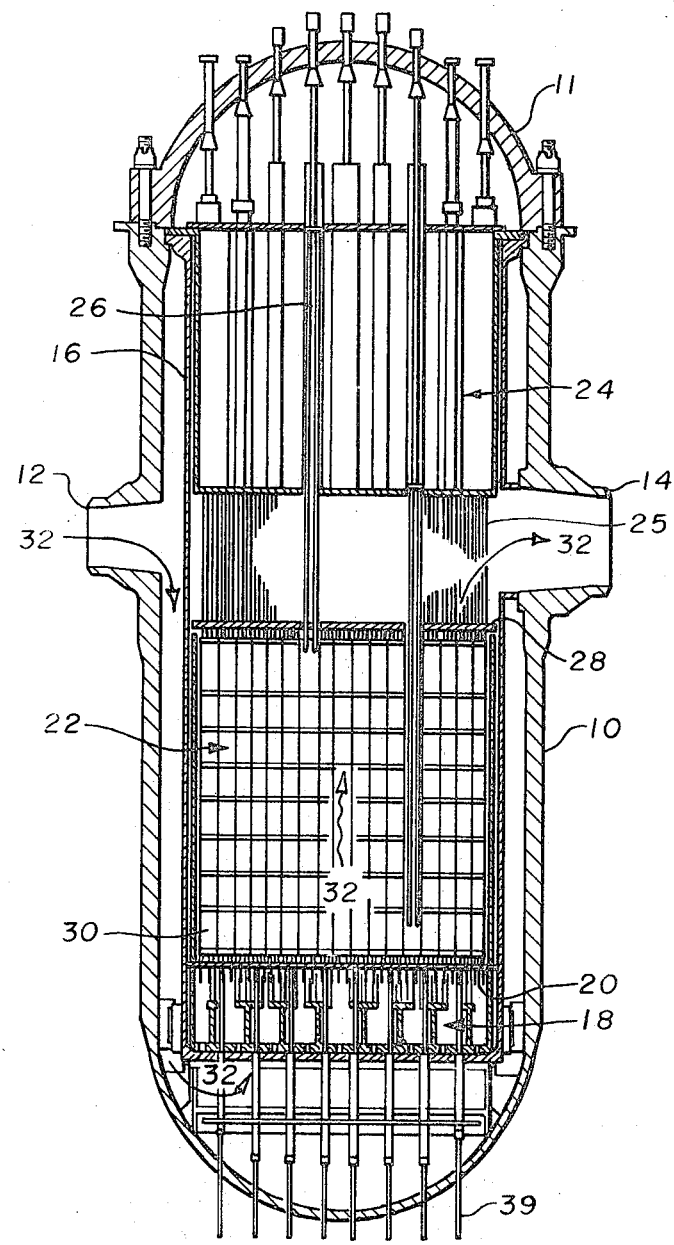
FIG. 1 is a vertical section through a nuclear reactor of the type embodying the present invention.

Referring first to FIG. 1, there is illustrated the reactor pressure vessel 10 of a pressurized water nuclear reactor. The reactor vessel 10 has a removable closure head 11 and includes inlet nozzle 12 and outlet nozzle 14 for the ingress and egress of reactor coolant, such as water, passing through the vessel. A stainless steel core support barrel 16 is attached to and supported within the reactor vessel 10. Attached to the lower end of the core support barrel 16 is a core support assembly 18 which includes a lower core support plate 20, containing a multitude of flow openings 21, shown in FIG. 2, upon which the reactor's active core 22 is supported. Also contained in the core support barrel 16 above the core 22, is an upper guide structure 24. This structure is suspended from the upper end of the barrel and includes means 25 for guiding control element assemblies 26 into the core region. Affixed to the lower end of the upper guide structure is the upper fuel assembly alignment plate 28. The reactor core 22 is comprised of a plurality of elongated fuel assemblies 30, extending vertically between and supported and aligned by the core support plate 20 and the alignment plate 28. The coolant flow path within the pressure vessel 10 as indicated by arrows 32 is from the inlet nozzle 12 downwardly between the pressure vessel 10 and core support barrel 16 into the area of the core support assembly 18 and upwardly through the coolant openings 21 in the core support plate 20, through the fuel assemblies 30 in the core 22, and ultimately out through the outlet nozzle 14.

Figure 2:
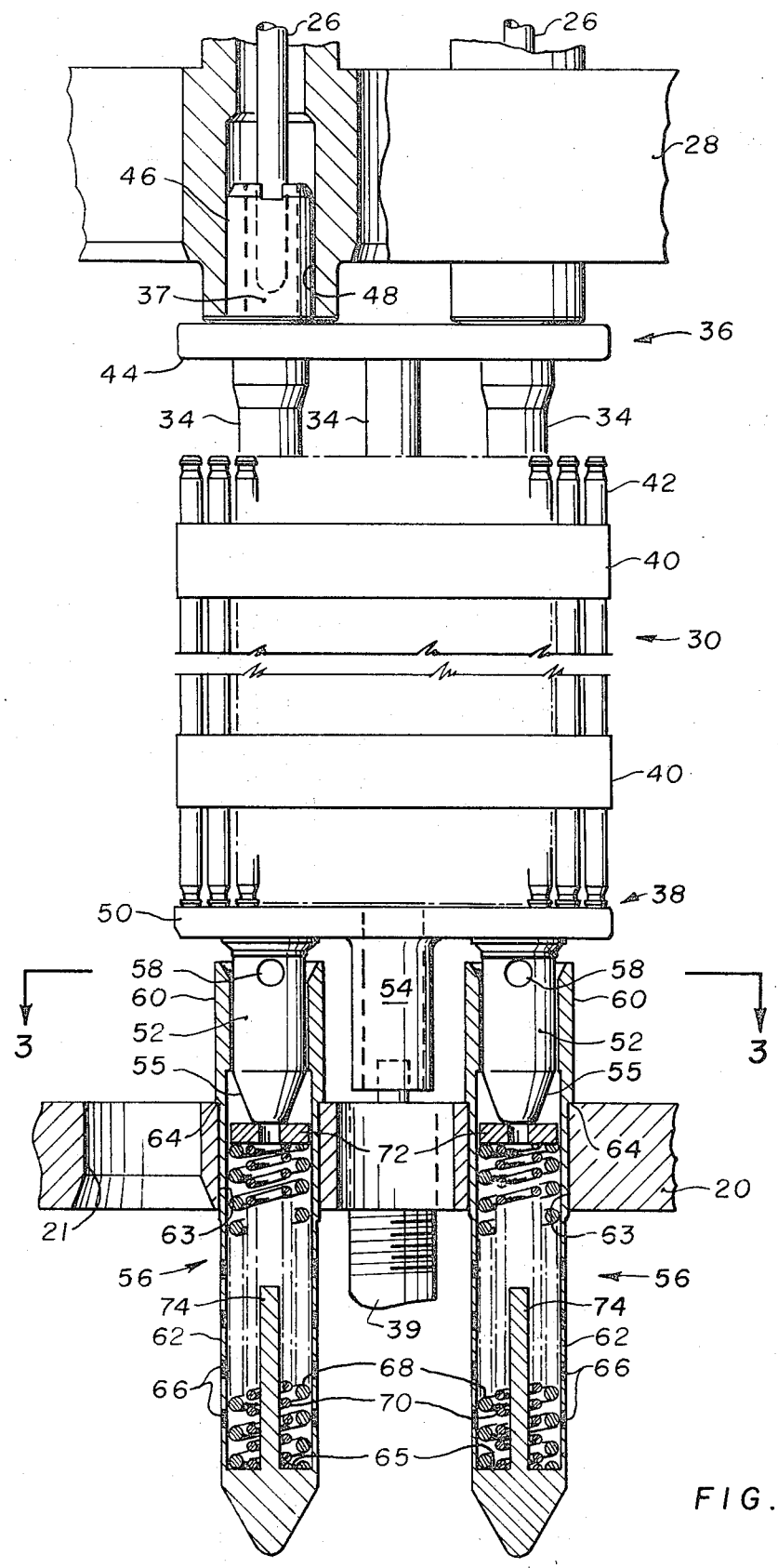
FIG. 2 is a fragmentary side view of a fuel assembly extending between upper and lower core support structure and having a section showing one embodiment of the hold-up device of the invention.
Figure 3:
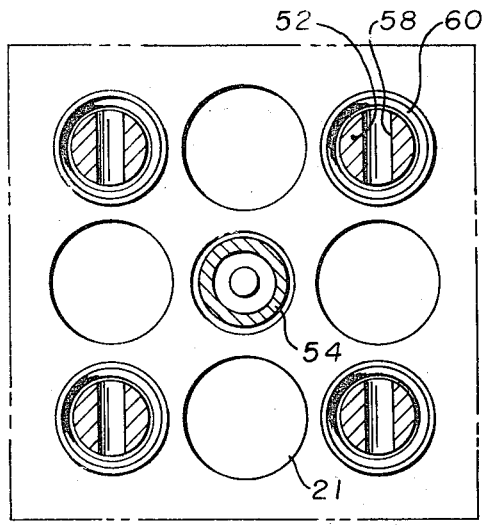
FIG. 3 is a ssectional view taken along the line 3—3 of FIG. 2. The outer boundary of the figure represents the area of the core support plate occupied by one fuel assembly.

Referring now to FIGS. 2 and 3, a typical fuel assembly 30 is comprised of five vertically extending Zircaloy guide tubes 34 coextensive with one another and which are mechanically attached to stainless steel upper and lower end fittings 36 and 38, respectively. The guide tubes 34 and fittings 36, 38 provide the structural framework for the fuel assembly 30. A plurality of rectangular fuel spacer grids 40 are welded to the guide tubes 34 at various elevations along the length of the tubes. These grids are fabricated from preformed Zircaloy strips interlocked in an egg crate fashion and welded together. Extending through the spacer grids 40, in a parallel vertical arrangement are a plurality of elongated fuel rods 42. The fuel spacer grids 40 maintain the fuel rod pitch within the assembly over the full length of the fuel rods 42.

The fuel assembly upper end fitting 36 is typically a cast rectangular end plate 44 containing a plurality of flow passages, not shown. Extending upwardly from the end plate 44, in axial alignment with the four outer guide tubes 34, are four upper fuel assembly alignment posts 46. These posts are typically made from stainless steel and each is slidably received in a mating post engaging sleeve 48 extending from the fuel assembly alignment plate 28. These posts are preferably hollow and communicate with their associated guide tubes 34 to form vertical coolant flow paths 37 therewith.

The lower end fitting 38 is comprised essentially of a lower end plate 50 having four lower alignment posts 52 depending downwardly therefrom in axial alignment with the four outer guide tubes 34. A boss 54 having a central bore extends downwardly from the center of the lower plate and interconnects with the centrally located guide tube 34 for use of in-core instrumentation probes 39 which enter from the lower end of the pressure vessel, as best shown in FIG. 1.

The lower alignment posts 52 are tapered at their lower ends 55 to facilitate insertion into the fuel assembly hold-up devices 56 which will be subsequently described in detail. Near the upper end of each post is a horizontal through opening 58 which is interconnected by way of an internal vertical passageway (not shown) to the interior of the adjacent guide tube 34 to complete the coolant flow paths 37 through the four fuel assembly outer guide tubes.

While there is a fuel assembly hold-up device 56 associated with each of the four lower alignment posts 52, since they are identical in construction only one will be described in detail. Each fuel assembly hold-up device 56 comprises a post engaging section 60 and a spring containment section 62. The device is press fitted into an opening 63 in the core support plate 20 from the upper side and is restrained from further downward motion, once in the proper position, by means of a circumferential shoulder 64 engaging the upper surface of the core support plate 20. Other means for supporting the hold-up device 56 in the core support plate 20, such as, for example, a threaded connection, could of course by used here.

The post engaging sections 60 are sized to slidably receive the lower alignment posts 52 so as to restrain them from lateral motion and permit relative axial motion therebetween. The inner surface of the upper end of the section 60 is chamfered to encourage flow into the openings 58. The spring containment section 62 is circular in cross section and has a solid lower end forming in the interior thereof a spring retaining surface 65. It also contains a plurality of coolant passages 66 in the sides thereof, which are provided primarily for allowing flowing coolant to flush the interior of these sections. Coaxially disposed within this section are two coil springs 68, 70 which are, when the fuel assemblies are installed, in partial compression and react upwardly, through an intermediate spacer member 72, on the lower ends of the alignment posts 52. As a result, with the upper guide structure 24 in place the entire fuel assembly 30 is loaded against the alignment plate 28. The combined spring rate of, and the amount of compression of, the springs 68, 70 is selected such that the total upward force on the fuel assembly 30 exerted by the four hold-up devices is at least equal to the weight of the fuel assembly.

Projecting upwardly from the solid lower end of the spring containment section 62, into the interior of this section, is an elongated cylindrical member 74. This member extends along the central axis of the containment section 62 and is of such a diameter that the smaller of the two springs 70 fits around it with a clearance which will permit free working of the spring and yet preclude significant lateral deflection of the spring. The outside diameter of the larger of the springs 68 has a similar clearance fit with the inside surface of the spring containment section 62. The two springs can thus work freely and cannot laterally deflect to interfere with one another.

Installation of a fuel assembly in a reactor incorporating this invention is accomplished in the following manner. The reactor closure head 11 and upper guide structure 24 are removed from the reactor vessel 10. The proper number of hold-up devices 56 are inserted into the core support plate 20 and the fuel assembly 30 is lowered into the core region 22 from the open upper end of the vessel 10 until the lower alignment posts 52 enter the post engaging section 60 of the hold-up devices 56. At this time the full weight of the fuel assembly 30 is bearing on the springs 68, 70 in the hold-up device. The upper guide structure 24 is then lowered into the reactor and the fuel assembly alignment plate 28 is engaged with the upper alignment posts 46 of the fuel assembly. The reactor closure head is then installed and secured to the reactor vessel 10. The installation of the upper guide structure 24 and closure head results in further compression of the springs 68, 70 of the hold-up devices to insure that the fuel assemblies 30 are firmly loaded against the fuel assembly alignment plate 28.

While in the preferred embodiment a hold-up device having two springs in each cartridge has been described it should be understood that one spring, or more than two, could be successfully employed.

Figure 5:
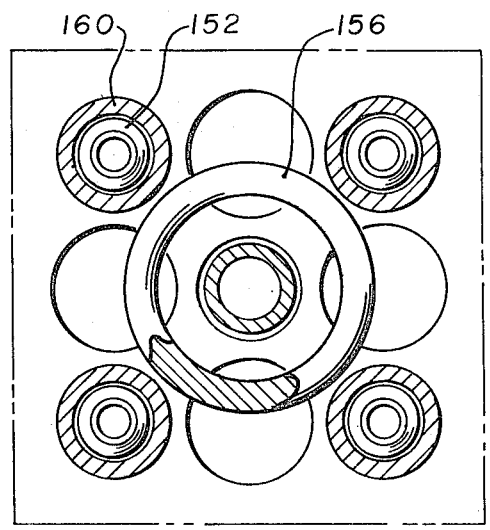
FIG. 5 is a sectional view taken along the line 5—5 of FIG. 4. The outer boundary of the figure represents the area of the core support plate occupied by one fuel assembly.
Figure 4:
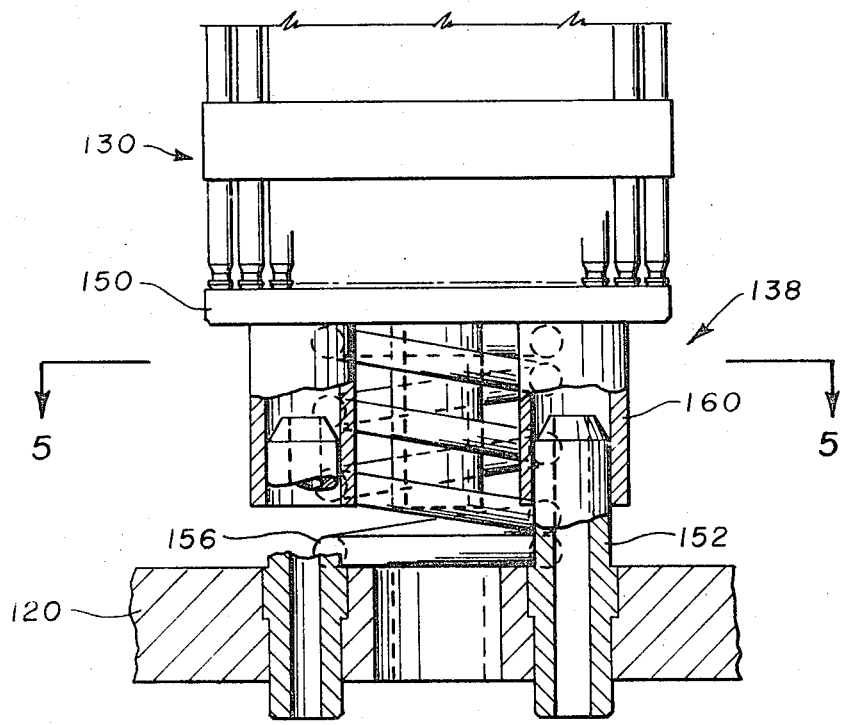
FIG. 4 is a fragmentary side view of the lower end of a fuel assembly showing another embodiment of the invention.

Referring now to FIGS. 4 and 5 a further embodiment of the invention is shown. In this design the hold-up device comprises a single large coil spring 156 interposed between the lower core support plate 120 and the end plate 150 of the lower end fitting 138. The spring 156 is sized, as described above, to insure that the fuel assembly 130 it works on is positively loaded against the fuel assembly alignment plate, not shown in these figures. In this embodiment the lower lateral alignment of the fuel assembly 130 is accomplished in a manner similar to that described above. The lower alignment posts 152 in this case are press fitted into and extend upwardly from the core support plate 120 while a post engaging means 160 extends downwardly from the lower end fitting plate 138. These alignment means, of which there are four positioned in a square pattern, also serve to align the spring 156 and prevent lateral deflection thereof.

While specific embodiments of the invention have been shown and described, it is to be understood that such showings are merely illustrative and that changes may be made without departing from the spirit and scope of the invention as claimed.

What is claimed is:

1. In a nuclear reactor core,
   means defining lower core support structure;
   means defining upper core alignment structure;
   a plurality of fuel assemblies vertically disposed between said lower core support structure and said upper core alignment structure, each of said assemblies comprising an upper end fitting, a lower end fitting, structural means attached to each of said end fittings and supporting said fittings in parallel spaced relationship, a plurality of elongated fuel elements disposed in a generally parallel array, and support structures connected to said structural means and receiving therein said fuel elements to maintain them in a vertically extending position between said end fittings;
   means associated with said upper core alignment structure and said upper end fittings for laterally restraining each of said fuel assemblies while allowing limited axial movement thereof:
   a plurality of alignment posts affixed to each of said lower end fittings and extending downwardly therefrom;
   a post engaging means, associated with each of said alignment posts, affixed to and extending upwardly from said lower core support structure for slidably receiving and laterally restraining said alignment posts, said post engaging means including a spring containment section having spring retaining means at its lower end and means for transmitting downward force on said spring retaining means to said lower core support structure; and coil spring means in partial compression disposed within said spring receiving section, reacting downwardly against said lower core support structure and reacting upwardly through said lower end fittings to urge said fuel assemblies in engagement with said upper core alignment structure.

2. The apparatus of claim 1 wherein said spring containment section extends through said lower core support structure and projects downwardly therefrom, and wherein said means for transmitting downward force comprises a downwardly facing shoulder on said post engaging means engaging an upwardly facing surface of said lower core support structure.

3. The apparatus of claim 2 wherein said coil spring means comprises two coaxially disposed coil springs.

4. The apparatus of claim 3 wherein said spring containment section is circular in cross section and includes an elongated cylindrical member smaller in diameter than said section which projects upwardly from the lower end of and along the axis of said section into the interior thereof; and wherein the inside diameter of the first of said two springs is substantially equal to the diameter of said cylindrical member and the outside diameter of the second of said two springs is substantially equal to the inside diameter of said spring receiving section, whereby said two springs are substantially restrained from lateral motion within said section.

* * * * *